United States Patent [19]
Schultz et al.

[11] Patent Number: 5,829,186
[45] Date of Patent: *Nov. 3, 1998

[54] FISHING LURE

[76] Inventors: Benjamin I. Schultz; Leslie Ann Thomas, both of 3706 N. Ocean Blvd., Suite 352, Ft. Lauderdale, Fla. 33308

[*] Notice: The term of this patent shall not extend beyond the expiration date of Pat. No. 5,611,168.

[21] Appl. No.: 755,307

[22] Filed: Nov. 22, 1996

Related U.S. Application Data

[63] Continuation-in-part of Ser. No. 561,798, Nov. 22, 1995, Pat. No. 5,611,168.

[51] Int. Cl.$^6$ .................................................. A01K 83/06
[52] U.S. Cl. ............................................. 43/44.6; 43/44.8
[58] Field of Search ................... 43/42.37, 44.2, 43/44.4, 44.6, 44.8, 41

[56] References Cited

U.S. PATENT DOCUMENTS

| | | | |
|---|---|---|---|
| 2,467,971 | 4/1949 | Frair | 43/41 |
| 2,500,451 | 3/1950 | Codd | 43/41 |
| 2,557,577 | 6/1951 | Soma | 43/41 |
| 2,765,574 | 10/1956 | Martin | 43/44.4 |
| 2,895,254 | 7/1959 | Krauss | 43/44.6 |
| 2,937,466 | 5/1960 | Mays | 43/41 |
| 3,760,526 | 9/1973 | Hicks | 43/44.4 |
| 3,760,529 | 9/1973 | Hicks | 43/41 |
| 3,844,060 | 10/1974 | Kurachi | 43/41 |
| 3,893,255 | 7/1975 | Hicks | 43/41 |
| 3,914,896 | 10/1975 | Sahagian | 43/44.6 |
| 4,233,771 | 11/1980 | Robinson | 43/41 |
| 4,796,376 | 1/1989 | Schlaegel | 43/41 |
| 5,189,826 | 3/1993 | Schlaegel | 43/44.6 |
| 5,611,168 | 3/1997 | Schultz | 43/44.8 |

*Primary Examiner*—Jack W. Lavinder
*Attorney, Agent, or Firm*—Oltman, Flynn & Kubler

[57] ABSTRACT

A fishing lure for securing bait includes an elongated upper jaw having a front end and a rear end; an elongated lower jaw having a front end and a rear end and a lower surface; a pivotal connection hinge between the front end of the upper jaw and the front end of the lower jaw; a first row of teeth on an interior surface of the upper jaw; a second row of teeth affixed to an interior surface of the lower jaw, the first row of teeth facing the second row of teeth, wherein bait fish are secured between the first row of teeth and the second row of teeth; a hook connected to the rear end of the lower jaw; and a buoyant element secured to the upper jaw front end to elevate the front end relative to the rear end. The fishing lure preferably additionally includes a keel extending longitudinally along and protruding outwardly from the lower jaw for minimizing lateral drifting of the lure. The fishing lure preferably additionally includes a top half wall attached to the upper jaw forward of the first row of teeth; and a bottom half wall attached to the lower jaw forward of the second row of teeth, where closing the upper jaw to the lower jaw enables the top half wall to cause a closure against the bottom half wall for keeping water from washing the bait out.

20 Claims, 3 Drawing Sheets

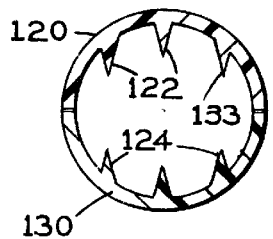
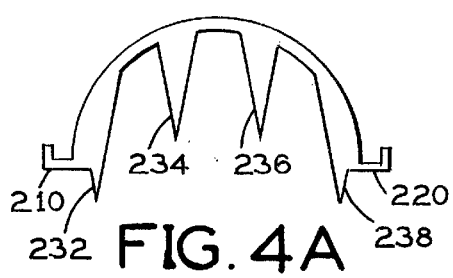
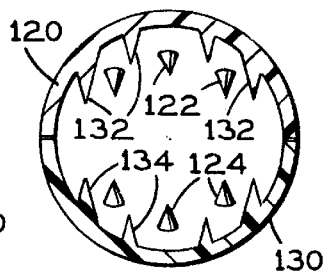
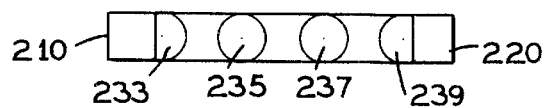
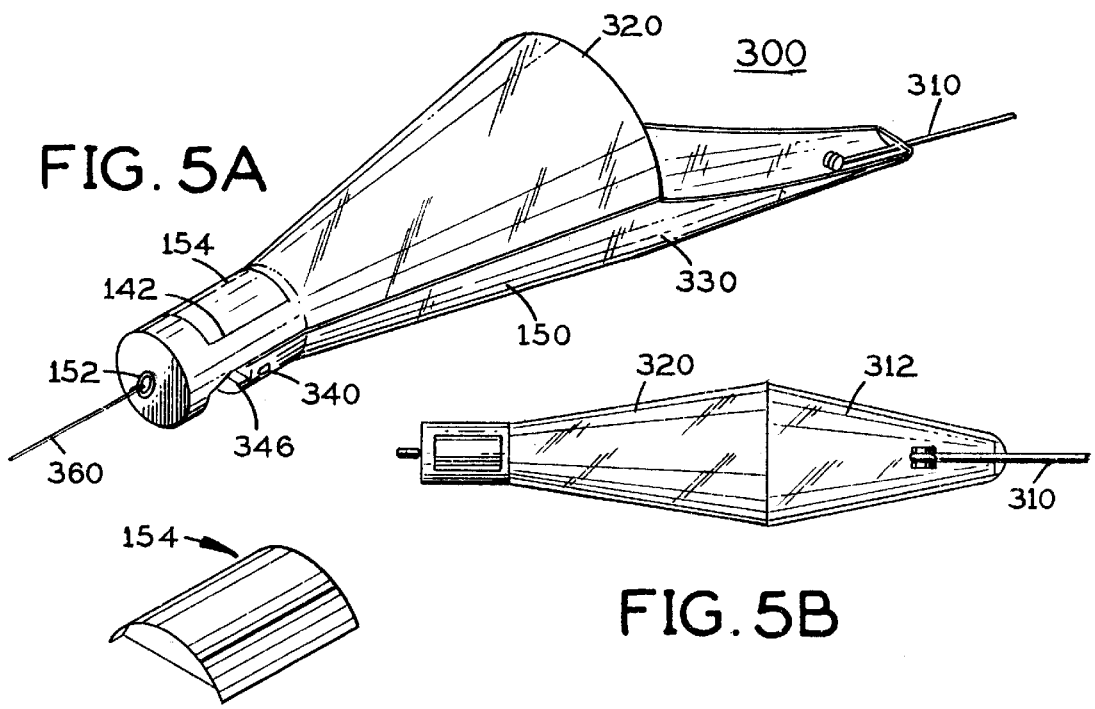
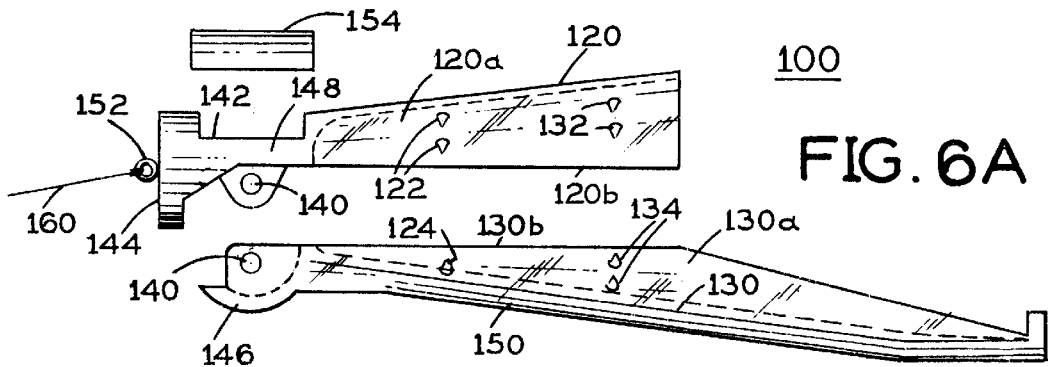

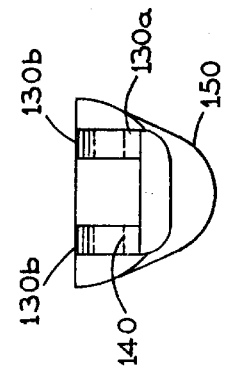
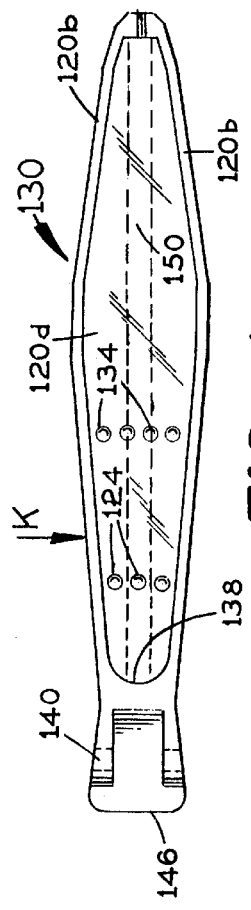
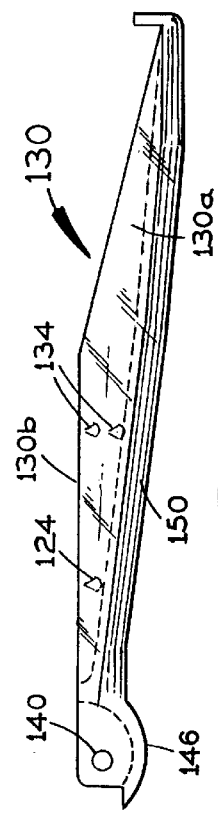
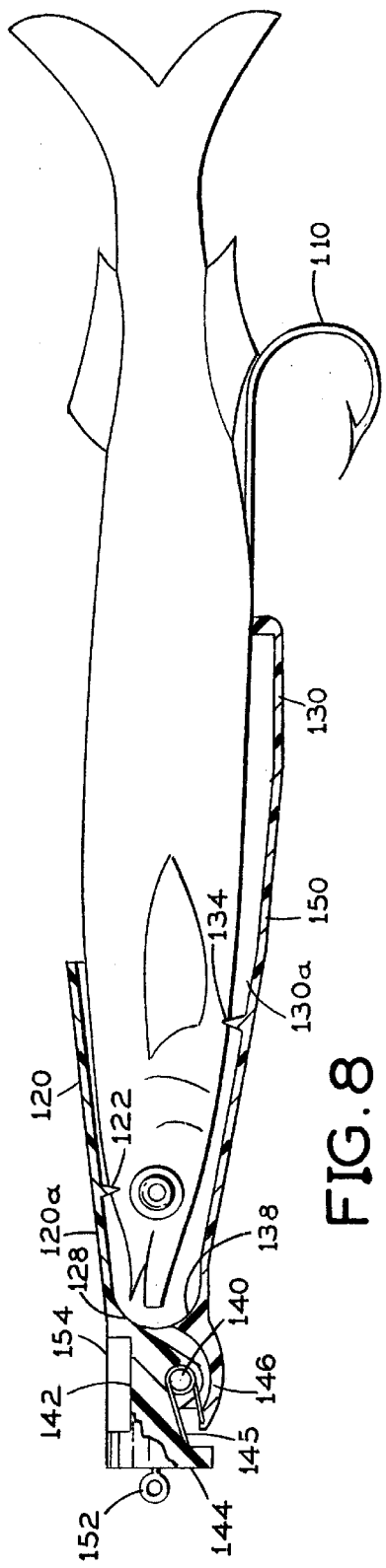

5,829,186

FISHING LURE

This application is a continuation-in-part of application Ser. No. 08/561,798, filed on Nov. 22, 1995 now U.S. Pat. No. 5,611,168.

BACKGROUND OF THE INVENTION

1. Field of the Invention

The present invention relates generally to the field of fishing lures. More specifically the present invention relates to deep sea bait holding devices having interior teeth for trapping and holding bait within the lure, which is attached to a fishing line.

2. Description of the Prior Art

Fishing lures holding bait such as shrimp, minnows, herring and the like have been extensively used in the past. The bait is used to attract fish as surrounding water passes about the lure. See for example U.S. Pat. Nos. 2,500,451 to Codd; 2,557,577 to Soma; 2,765,574 to Martin; 2,937,466 to Mays; 3,760,526 to Hicks; 3,760,529 to Hicks; 3,844,060 to Kurachi; 3,914,896 to Sahagian; 4,233,771 to Robinson; 4,796,376 to Schlaegel; 3,914,896 to Sahagain and 3,893,255 to Hicks.

However, several problems exist with many of these prior art lures. For example, many of the lures inadequately secure the enclosed bait in place, resulting in loss of the bait to the passing water current. The bait holding housing allows water to pass about the bait and dislodge the bait from the housing. Thus, fishermen have to constantly replenish the bait in their prior art lures. Furthermore, many of the lures are capable of holding only one size of bait and thus are not versatile enough to hold different sizes of bait for catching different sizes of fish.

Thus, the need exists for an improved fishing lure that avoids the problems of the prior art discussed above.

It is thus a first object of the present invention to provide a fishing lure for adequately securing bait to the lure.

The second object of this invention is to provide a fishing lure having rows of interior teeth for securing the bait within the lure.

The third object of this invention is to provide a fishing lure that does not allow water to pass through the interior of the bait support housing.

The fourth object of this invention is to provide a fishing lure for securing various size bait within its housing.

The fifth object of this invention is to provide a fishing lure which automatically orients itself in the water such that the forward end of the lure is elevated relative to the rearward end of the lure to prevent the lure from diving during trolling.

The sixth object of this invention is to provide a fishing lure which cuts a steady, substantially unwavering path through the water behind the boat, only minimally buffeted by turbulence.

Two preferred embodiments of fishing lures are described. The first preferred embodiment includes an elongated upper jaw having a front end and a rear end, and a pivotal connection hinge between the front end of the upper jaw and the front end of the lower jaw. A biasing spring keeps the upper and lower jaw members pivoted together. The upper jaw includes a front row of teeth and a rear row of teeth located parallel to one another. The lower jaw includes a similar set of a front row of teeth and a rear row of teeth located in parallel to one another. Bait fish are secured between the upper and lower jaw members. A fishing hook is connected to the back end of the lower jaw. Each of the individual teeth members is cone shaped. All of the teeth in the front row are approximately ⅛ inches long, and each of the rear teeth are approximately ⅛ inches long. Detachable teeth covers approximately ⅝ inches long can be used for lengthening each tooth of the upper rear rows of teeth.

A buoyant element is preferably secured to the upper jaw front end to elevate the front end relative to the rear end to keep the lure upright. The buoyant element is preferably a hollow box molded into the upper jaw front end, containing air, another gas or a vacuum.

A keel preferably extends longitudinally along and protrudes outwardly from the lower surface of the lower jaw for minimizing lateral drifting of the lure during trolling. The keel is alternatively contoured to form a low profile rudder.

The materials used in the lure can be molded plastic, see-through plastic, metal such as aluminum, stainless steel and the like and combinations thereof.

Further objects and advantages of this invention will be apparent from the following detailed description of a presently preferred embodiment which is illustrated schematically in the accompanying drawings.

SUMMARY OF THE INVENTION

The present invention accomplishes the above-stated objectives, as well as others, as may be determined by a fair reading and interpretation of the entire specification.

A fishing lure is provided for securing bait, including an elongated upper jaw having a front end and a rear end; an elongated lower jaw having a front end and a rear end and a lower surface; a pivotal connection hinge between the front end of the upper jaw and the front end of the lower jaw; a first row of teeth on an interior surface of the upper jaw; a second row of teeth affixed to an interior surface of the lower jaw, the first row of teeth facing the second row of teeth, wherein bait fish are secured between the first row of teeth and the second row of teeth; a hook connected to the rear end of the lower jaw; and a buoyant element secured to the upper jaw front end to lift the front end relative to the rear end.

The fishing lure preferably additionally includes a keel extending longitudinally beneath the lower portion of the lower jaw for minimizing lateral drifting of the lure. The fishing lure preferably additionally includes a top half wall attached to the upper jaw forward of the first row of teeth; and a bottom half wall attached to the lower jaw forward of the second row of teeth, where closing the upper jaw to the lower jaw enables the top half wall to cause a closure against the bottom half wall for keeping water from washing the bait out. The fishing lure preferably further includes a third row of teeth affixed to the upper elongated jaw rearwardly of the first row of teeth; and a forth row of teeth affixed to the lower elongated jaw rearwardly of the second row of teeth, where the third row of teeth is facing the fourth row of teeth. The fishing lure preferably further includes a detachable fifth row of teeth attached to the upper elongated jaw rearwardly of the third row of teeth. Each tooth in the first row of teeth and the second row of teeth is optionally individually cone shaped. Each tooth in the first row of teeth and the second row of teeth is preferably approximately ⅛ inches long. Each tooth in the third row of teeth and the forth row of teeth is preferably approximately ⅛ inches long. The fishing lure preferably additionally includes a detachable upper teeth cover for the third row of teeth. The fishing lure preferably further includes a spring for biasing the upper elongated jaw and the lower elongated jaw together along the pivotal connection hinge. The first row of teeth and the second row of teeth are optionally formed from metal, or of plastic. Where each of the teeth in the top front row of teeth and the bottom front row of teeth is approximately ⅛ inches long, and each tooth in the top rear row of teeth and the bottom rear row of teeth is approximately ⅛ inches long; the lure preferably further includes a detachable upper teeth cover for lengthening the upper rear row of teeth. The detachable upper teeth cover is optionally made of plastic or of metal. The lure preferably additionally includes a lure directing tab connected to the upper jaw front end and angling downwardly from the fishing lure longitudinal axis, said lure directing tab including line attachment means.

BRIEF DESCRIPTION OF THE DRAWINGS

Various other objects, advantages, and features of the invention will become apparent to those skilled in the art from the following discussion taken in conjunction with the following drawings, in which:

FIG. 2 is a cross-sectional view of the top front row of teeth of FIG. 1A along arrow X;

FIG. 3 is a cross-sectional view of the top rear row of teeth 132 of FIG. 1A along arrow Y;

FIG. 4A is a side view of a detachable cover plate for use with the embodiment of FI. 1A;

FIG. 4B is a bottom view of the cover plate of FIG. 4A along arrow Z;

FIG. 5A is a perspective view of a second preferred embodiment of the subject invention;

FIG. 5B is a top view of the embodiment of FIG. 5A along arrow R;

FIG. 6A is an exploded side view of the subject invention, showing the buoyant element feature in the form of a hollow box and box recess;

FIG. 6B is a perspective view of the hollow box, showing the preferred curved shape to conform to the shape of the remainder of the lure;

FIG. 7A is a top view of the lower jaw member, showing the preferred keel feature in broken lines;

FIG. 7B is a side view of the lower jaw member of FIG. 7A.

FIG. 7C is a cross-sectional view of the lower jaw member of FIG. 7A, taken in the direction of arrow K; and FIG. 8 is a side view of the subject invention having the buoyant element hollow box and keel features, and loaded with a bait fish.

DETAILED DESCRIPTION OF THE PREFERRED EMBODIMENTS

Figure 1A:
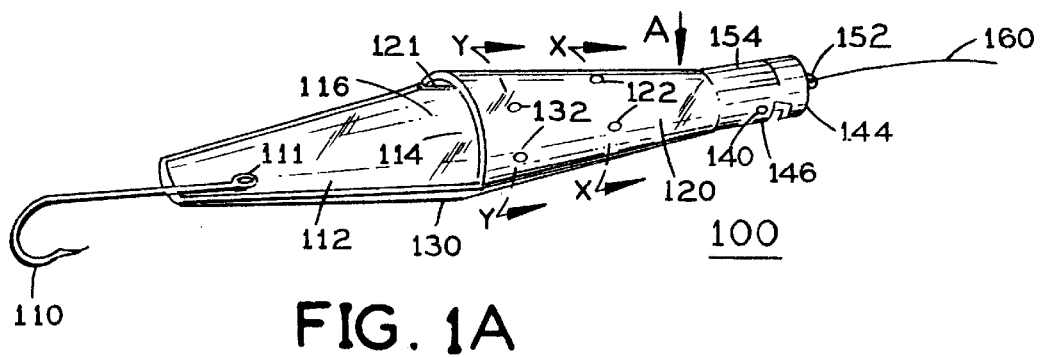
FIG. 1A is a perspective view of a first preferred embodiment of the subject invention.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Figure 1B:
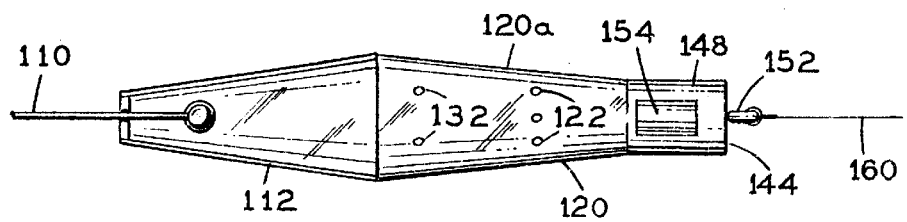
FIG. 1B is a top view of the embodiment of FIG. 1A along arrow A.

FIG. 1A is a perspective view of a first preferred embodiment 100 of the subject invention. FIG. 1B is a top view of the embodiment of FIG. 1A along arrow A. Referring to FIGS. 1A and 1B, the subject invention 100 includes a hook 110 attached to loop hook end 111 on rear tab 112. An open channel area or cavity space 114 is formed between upper hollow U-shaped jaw member 120 having a laterally arched upper jaw wall 120a and lower hollow U-shaped jaw member 130 having a laterally arched lower jaw wall 130a, which are pivotally connected along rotatable hinge 140. The upper jaw member 120 has a longitudinal upper jaw wall edge 120b, and the lower jaw member 130 has longitudinal lower jaw wall edge 130b. Jaw members 120 and 130 are biased in a closed position by interior spring 145 upper jaw member 120 and lower jaw member 130 define a tubular structure when closed together. To open jaw members 120 and 130, a user compresses tab 146 upward along the direction of arrow B while pushing surface area 148 downwardly along the direction of arrow C. Inside each jaw member 120 and 130 are front rows of teeth members 122 and 124 which also face one another, and at least two rows of rear teeth members 132 and 134 which face one another. Cavity space 114 has a larger diameter at the cavity back area 116 going toward a smaller and narrower diameter toward the front.

Figure 1C:
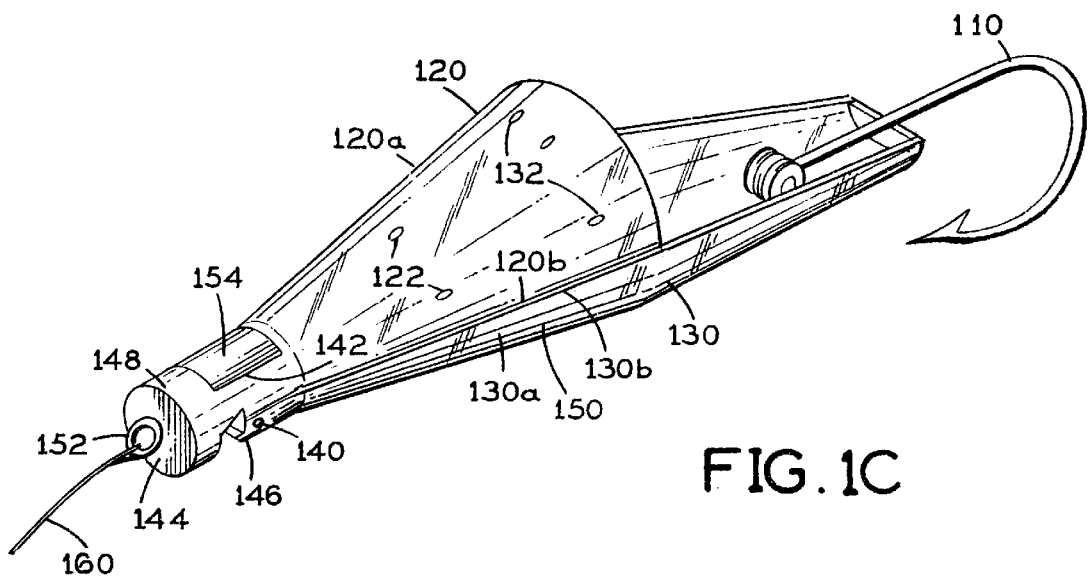
FIG. 1C is a perspective view of the embodiment of FIG. 1A oriented differently.

FIG. 2 is a cross-sectional view of the top front row of teeth 122 of FIG. 1A, including individual teeth 123, taken along the direction of arrow X. FIG. 3 is a cross-sectional view of the top rear row of teeth 132 of FIG. 1A, together with each of the individual teeth 133, along the direction of arrow Y. Referring to FIGS. 1A, 1B, 2 and 3, each tooth is cone-shaped and is approximately ⅛ inch in length for the rear rows of teeth and approximately ⅛ inch in length for each of the front rows of teeth. The rows of teeth 122, 132, 124 and 143 can effectively secure small bait such as ballyhoo, mullet and the like therebetween. FIG. 1C is a perspective view of the embodiment 100 of FIG. 1A.

Referring to FIG. 1A–1C, the material used for upper and lower jaw members 120 and 130 can be a visually clear plastic which would allow the bait inside to be visible from outside. In the back areas of each of the jaw members 120 and 130 are respective half wall members 128 and 138 which, when in the closed position, can effectively block any water from passing through cavity space 114.

A buoyant element is preferably secured to upper jaw member 120 front end to elevate the front end relative to the rear end to keep the lure upright. The buoyant element is preferably a hollow box 154 molded into the upper jaw member 120 front end or secured into a box notch or recess 142, containing air, another gas or a vacuum. See FIGS. 6A and 8. The lateral cross-sectional shape of hollow box 154 is preferably arched to conform to the shape and contour of the rest of lure invention 100. See FIG. 6B.

The front of lure invention 100 preferably has a blunt and cross-sectionally rounded nose wall 144 for minimizing turbulence. A line 160 securing loop 152 is secured to nose wall 144.

Figure 1D:
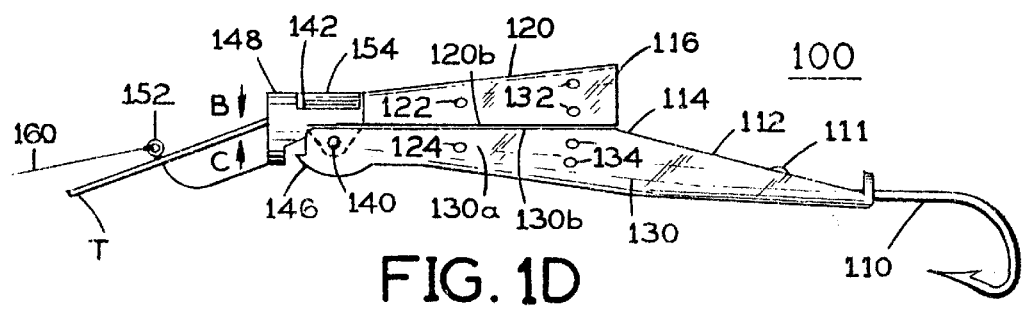
FIG. 1D is a side view of the subject invention having the front tab T, disclosed in detail in the parent application, angling downwardly from the lure front end, and also having the buoyant element hollow box feature and the keel feature of the present application.

A keel 150 preferably extends longitudinally along and protrudes outwardly from the lower portion of the lower jaw member 130 for preventing lateral drifting of lure invention 100 during trolling. See FIGS. 7A–7C and 8. Keel 150 may alternatively take the form of a low profile fin keel or rudder. The keel 150 and buoyant element hollow box 154 are shown in FIG. 1D in conjunction with the fishing lure directing front tab T feature disclosed in the parent application. The front lure directing tab T is bent at approximately a 45 degree angle relative to the longitudinal axis of the lure invention 100 structure and has an eye socket S for attachment to a fishing line 160. Thus lure 100 moves in the direction of arrow D. The 45 degree bend causes the lure to dive into the water and be used for deep sea fishing.

The materials forming the various components in the preferred embodiment 100 of FIG. 1A–1B can be formed from molded plastic. The components can also be formed from metal such as but not limited to aluminum, stainless steel and the like, as well as combinations thereof.

FIG. 4A is a side view of a detachable cover plate for use with the embodiment of FIG. 1A. FIG. 4B is a bottom view of the cover plate of FIG. 4A along arrow Z. Referring to FIGS. 4A–4B, detachable upper teeth cover includes side clips 210 and 220 for attaching the cover plate to the side edges 121 and 123 of upper U-shaped jaw member 120 of FIG. 1A. Cover 200 includes elongated teeth 232, 234, 236 and 238 that have tops 233, 235, 237 and 239, respectively. Cover 200 fits next to rear upper teeth 132 of FIG. 3. Using these detachable covers allows for adequately securing thinner sizes of fish bait within the clamping jaw members 120 and 130. The length of the individual teeth members 232, 234, 236 and 238 is greater than the length of the existing row of teeth 132 which is to be covered. For example, teeth 232, 234, 236 and 238 can have a length of ⅝ inch.

FIG. 5A is a perspective view of a second preferred embodiment of the subject invention. FIG. 5B is a top view of the embodiment of FIG. 5A along arrow R. Referring to FIGS. 5A and 5B, embodiment 300 includes an upper jaw member 320, lower jaw member 330, hinge spring 340, clamping members 346 and 348, fish hook 310 and fishing line 360 which correspond to like components of FIGS. 1A–1C. Embodiment 300 can include rows of teeth and the detachable teeth cover as previously described.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A fishing lure for securing bait, comprising:
an elongated upper jaw having a laterally arched upper jaw wall with a front end and a rear end and at least one longitudinal upper jaw wall edge;
an elongated lower jaw having a laterally arched lower jaw wall with a front end and a rear end and a lower surface and at least one longitudinal lower jaw wall edge;
a pivotal connection hinge between the front end of the upper jaw and the front end of the lower jaw permitting said upper jaw and said lower jaw to close together such that said longitudinal upper jaw wall edge meets and abuts said longitudinal lower jaw wall edge and said upper jaw and lower law define in combination a substantially tubular structure;
a first row of teeth on an interior surface of the upper jaw;
a second row of teeth affixed to an interior surface of the lower jaw, the first row of teeth facing the second row of teeth, wherein bait fish are secured between the first row of teeth and the second row of teeth; and
a hook connected to the rear end of the lower jaw.

2. The fishing lure of claim 1, further comprising:
a top half wall attached to the upper jaw forward of the first row of teeth; and
a bottom half wall attached to the lower jaw forward of the second row of teeth, wherein closing the upper jaw to the lower jaw enables the top half wall to cause a closure against the bottom half wall for keeping water from washing the bait out.

3. The fishing lure of claim 1, further comprising:
a third row of teeth affixed to the upper elongated jaw rearwardly of the first row of teeth; and
a forth row of teeth affixed to the lower elongated jaw rearwardly of the second row of teeth, wherein the third row of teeth is facing the fourth row of teeth.

4. The fishing lure of claim 3, further comprising:
a detachable fifth row of teeth attached to the upper elongated jaw rearwardly of the third row of teeth.

5. The fishing lure of claim 3, wherein each tooth in the third row of teeth and the forth row of teeth is:
approximately ⅛ inches long.

6. The fishing lure of claim 3, further comprising:
a detachable upper teeth cover for the third row of teeth.

7. The fishing lure of claim 1, wherein each tooth in the first row of teeth and the second row of teeth is:
individually cone shaped.

8. The fishing lure of claim 1, wherein each tooth in the first row of teeth and the second row of teeth is:
approximately ⅛ inches long.

9. The fishing lure of claim 1, further comprising:
a spring for biasing the upper elongated jaw and the lower elongated jaw together along the pivotal connection hinge.

10. The fishing lure of claim 1, wherein the first row of teeth and the second row of teeth are formed from metal.

11. The fishing lure of claim 1, wherein the first row of teeth and the second row of teeth are formed from plastic.

12. The fishing lure of claim 1, wherein each of the teeth in the top front row of teeth and the bottom front row of teeth is:
approximately ⅛ inches long, and wherein each tooth in the top rear row of teeth and the bottom rear row of teeth is:
approximately ⅛ inches long;
further comprising a detachable upper teeth cover for lengthening the upper rear row of teeth.

13. The fishing lure of claim 12, wherein the detachable upper teeth cover is:
plastic.

14. The fishing lure of claim 12, wherein the detachable upper teeth cover is:
metal.

15. The fishing lure of claim 1, additionally comprising:
a buoyant element secured to the upper jaw front end to elevate said front end relative to the rear end.

16. The fishing lure of claim 1, additionally comprising a lure directing tab connected to the upper jaw front end and angling downwardly from the fishing lure longitudinal axis, said lure directing tab including line attachment means.

17. The fishing lure of claim 1, additionally comprising:
a keel extending longitudinally along the lower jaw for minimizing lateral drifting of the lure.

18. The fishing lure of claim 1, additionally comprising:
a buoyant element secured to the upper jaw front end to elevate said front end relative to the rear end.

19. The fishing lure of claim 1, additionally comprising a lure directing tab connected to the upper jaw front end and angling downwardly from the fishing lure longitudinal axis, said lure directing tab including line attachment means to cause the fishing lure to dive into the water as the fishing lure is towed.

20. A fishing lure for securing bait, comprising: an elongated upper jaw having a laterally arched upper jaw wall with a front end and a rear end and at least one longitudinal upper jaw wall edge;

an elongated lower jaw having a laterally arched lower jaw wall with a front end and a rear end and a lower surface and at least one longitudinal lower jaw wall edge;

a pivotal connection hinge between the front end of the upper jaw and the front end of the lower jaw permitting said upper jaw and said lower jaw to close together such that said longitudinal upper jaw wall edge meets and abuts said longitudinal lower jaw wall edge and said upper jaw and lower jaw define in combination a substantially tubular structure;

a laterally arrayed first row of teeth on an interior surface of the upper jaw;

a laterally arrayed second row of teeth affixed to an interior surface of the lower jaw, the first row of teeth facing the second row of teeth, wherein bait fish are secured between the first row of teeth and the second row of teeth; and a hook connected to the rear end of the lower jaw.

* * * * *